May 4, 1926.
J. TESSIER
1,583,706
PHOTOGRAPHIC CAMERA
Filed Feb. 8, 1923    2 Sheets-Sheet 1
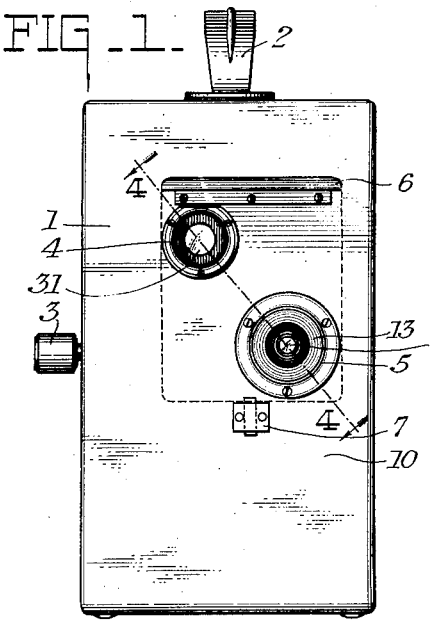
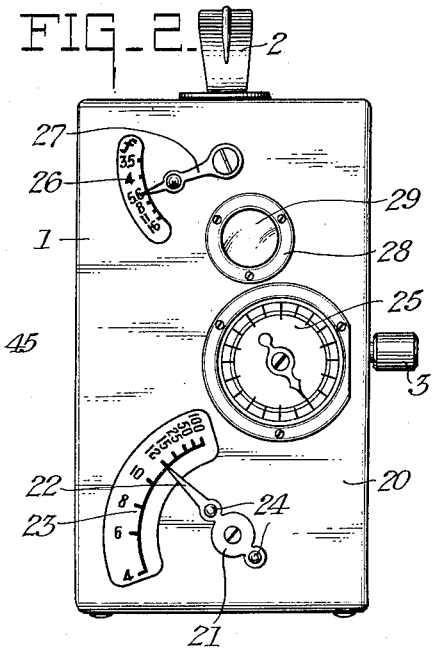
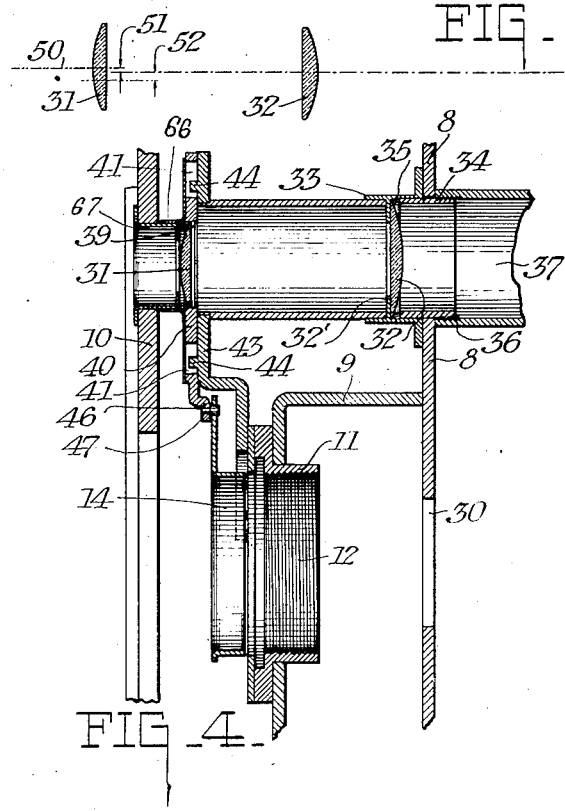
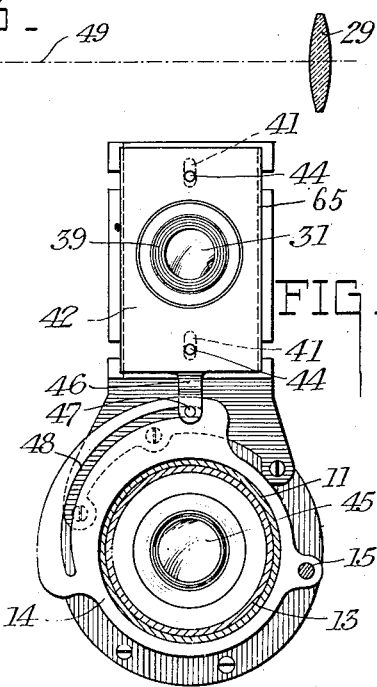
INVENTOR
*Julien Tessier,*
BY *R. L. Stinchfield*
*N. M. Perrins*
ATTORNEYS.

May 4, 1926.
J. TESSIER
1,583,706
PHOTOGRAPHIC CAMERA
Filed Feb. 8, 1923
2 Sheets-Sheet 2
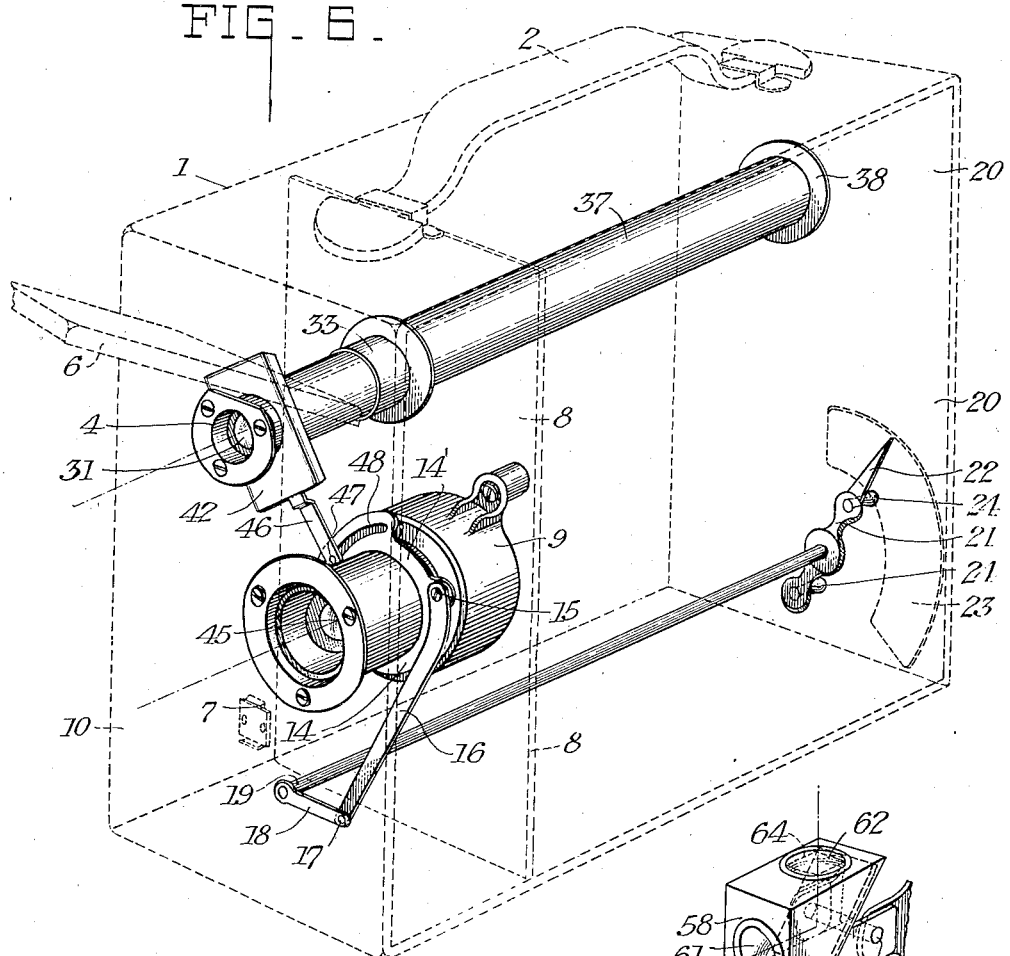
FIG_6.
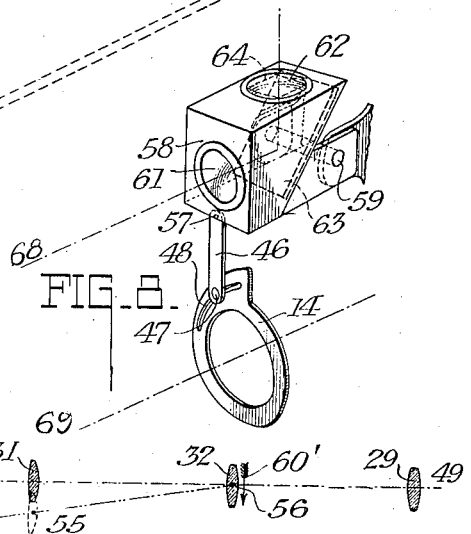
FIG_8.
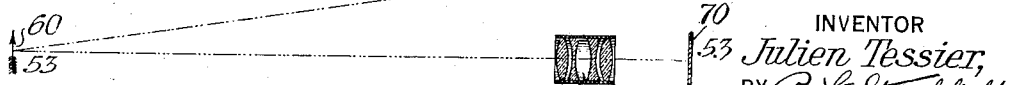
FIG_7.
INVENTOR
Julien Tessier,
BY R. L. Stuchfield
N. M. Perrin
ATTORNEYS.

Patented May 4, 1926.

1,583,706

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

Application filed February 8, 1923. Serial No. 617,838.

*To all whom it may concern:*

Be it known that I, JULIEN TESSIER, a citizen of the Republic of France, residing at Rochester, in the county of Monroe and State of New York, have invented certain new and useful Improvements in Photographic Cameras, of which the following is a full, clear, and exact specification.

This invention relates to photographic cameras and more particularly to the correlation of the finder and objective in a camera.

It is a common fault in cameras that the fields of the finder and of the camera objective do not coincide, usually because their optical axes are parallel and separated and no means of compensating for this error, known as stero-parallax, is provided. If the subjects to be taken are at a considerable distance, the error is small; but when, as in motion picture work, the subject is frequently very near, it is so great that it cannot be ignored. The principal object of this invention is to provide a camera in which the finder and objectives are so correlated that at all times the finder field will agree with the exposure field of the camera, and in which this correlation takes place automatically and with no attention from the operator. A further object is to provide such a mechanism which is simple and not liable to derangement, and which has a low manufacturing cost.

These and other objects will appear from a perusal of the specification and claims following, in which the invention is more particularly set forth. Reference will be made to the accompanying drawings in which the same reference characters refer to the same parts throughout and in which:

Fig. 1 is a front elevation of a motion picture camera embodying my invention;

Fig. 2 is a rear elevation of the same;

Fig. 3 is a diagram illustrative of the finder system;

Fig. 4 is a fragmentary sectional view on the line 4—4 of Fig. 1; the objective mount being omitted;

Fig. 5 is a front view of the same mechanism, the front of the camera being removed;

Fig. 6 is a perspective view of the finder, objective and their correlating mechanism, the camera being indicated in dotted lines;

Fig. 7 is a diagrammatic showing of the relation of the finder to the objective; and Fig. 8 is a fragmentary perspective view showing a modified form of my invention.

In the drawings is shown a motion picture camera comprising the usual box or casing 1 and having a carrying handle 2 and operating handle 3, the general structure of the camera being of the type shown in my copending application, Serial No. 378,618, filed May 3, 1920.

In the front 10 of the casings are openings 4 and 5 for the finder and objective respectively, there being a spring hinged door 6 which may be held in protective position over these by latch 7. Within the camera is a fixed partition 8, to which is attached a support 9 carrying a tubular member 11 having internal screw threads 12 in which the objective mount 13 carrying the camera objective 45 is adjusted back and forth. The mount 13 has attached rigidly thereto an annular member 14, to which is pivoted at 15 (Fig. 6) a link 16, pivoted in turn at 17 to the crank arm 18 rigid with shaft 19, which extends longitudinally of the camera and through the back wall 20 thereof. On its end is carried the cross member 21 which is pointed at 22 to act as an indicator in connection with the focusing scale 23, and carries lugs or finger pieces 24 by which it may be turned.

Also on the rear wall 20 of the camera are the film footage indicator 25, the diaphragm scale 26, and its corresponding setting pointer 27 and the window 28 in which is a lens 29 which will be mentioned later in connection with the finder system.

The objective is focused by turning the cross member 21 by the lugs 24, thereby turning the annular member 14 and moving the objective mount 13 or a part thereof axially to focus the objective on the exposure area through the gate 30 in the partition 8.

The finder system is a simple one and is indicated diagrammatically in Fig. 3. It comprises a front positive lens 31 and a second positive lens 32, these being so designed that there is formed at about the rear surface of the second lens 32 a real inverted image of the subject, which image is magnified and viewed through the lens 29. A mask 32' is placed immediately in front of the lens 32 and outlines the field viewed. The mask 32' is carried by a tubular support 33 carried by frame 8, and the lens is held against this mask by a tube 34 bearing against a washer 35. The tube 34 extends through the partition 8 and is externally screw threaded at 36. A tube 37 is screwed upon it and extends back to the rear wall of the camera, where it is held by a mount 38 (Fig. 6) within which is the lens 29.

The front finder lens 31 is carried in a mount 39 carried in a block 40 with slots 41. This block slides in a way formed by the sheet metal plate 42 with side flanges 65 and having a tubular extension 66 engaging the collar 67 in the front opening 4. The rear of the guideway is a fixed frame 43 having lugs 44 engaging the slots 41. The direction of sliding is radial of the main camera objective 45, as indicated on the section line 4—4 in Fig. 1. The block 40 has an extension 46 carrying a pin 47 engaging in a cam slot 48 in the annular member 14. The extent of movement of the front lens 31 is indicated in Fig. 3, where the normal axis of the finder system is indicated by the dot-dash line 49. The lens 31 is shown with its axial line 50 raised above 49 by the distance between the arrowheads 51. It is capable of movement beneath it or toward the axis of the main objective 45 by a distance indicated between the arrowheads 52. This diagram indicates the movement desirable when a corrected finder system is used with an expensive camera and when very close agreement between the finder field and the exposure field is desired. Since the finder system is obviously of fixed focus, its field does not for all distances agree exactly with that of the main objective at the exposure field. The axis 49 is, therefore, very slightly inclined to parallelism with the main axis and intersects it at a distance, say 25 feet, in front of the camera, and the finder system is focused and designed to give the field very exactly for this distance. For distant views the front lens is raised slightly, as indicated, and for "close-ups" is lowered.

In small and inexpensive cameras for use by amateurs such exactness is unnecessary and the finder system is built parallel with the axis of the main objective and its useful range is obtained by moving the front lens 31 toward the main objective 45. In either case it is apparent that the effective axis of the finder proper, that is, a line passing through the optical center of the front two lenses is tilted so that it intersects the axis of the camera objective 45 at the point upon which the latter is focused. This is indicated diagrammatically in Fig. 7, in which the line 49—49 is the axis of the finder system, passing through the centers of all three lenses parallel to the axis 53—53 of the objective 45, which would be its position when the camera is focused for infinity. When the objective 45 is focused on the exposure area 70 for a near point, 53, the effective axis of the finder is the line 53—55—56, 55 and 56 being the optical centers of the lenses 31 and 32. This produces an image as before described at about the rear surface of lens 32, which image is magnified and inspected through lens 29. The image is a real inverted image, as indicated by the arrows 60—60; designating respectively the object and the image.

My invention is applicable to the ordinary reflecting type of finder, the optical system of which has merely two lenses corresponding to the present lenses 31, 32, but with a mirror between them which reverses the image Such a finder is shown in Fig. 8, in which 14 is the annular member on the lens mount having the cam slot 48, in which plays the pin 47 caried by extension 46, as has already been described. This extension is pivoted at 57 to the finder 58 which is pivoted as a whole at 59, and comprises the front lens 61, the rear lens 62 and the mirror 63, there being a mask 64 in front of lens 63. In this case the effective optical axis of the finder system is the line 68 from the point focused on through the center of lens 61 to the center of lens 62 after reflection. This line is inclined more or less to the line 69 indicating the axis of the principal objective, not shown, as the cam ring 14 for focusing the latter is turned.

The operation of the described structure is believed to be obvious from the above description. The user sets the focusing pointer 22 on the scale 23, according to the estimated or measured distance to the subject and looks through the finder to ascertain the field covered. The camera or the subject is then moved until the composition as seen in the finder is to the operator's liking and then he turns the operating handle 3, as usual. Of course, the focusing pointer will be changed from time to time as the subject recedes from or approaches the camera. The user can tell at all times whether or not the subject is properly centered and whether any undesirable features are in or out of the field.

It is apparent that numerous variations are possible, and I contemplate as within the scope of my invention all such modifications and equivalents as fall within the appended claims.

Having thus described my invention, what I claim as new and desire to secure by Letters Patent is:

1. In a photographic camera having an objective and a finder lens, means for simultaneously focusing the objective and automatically moving the finder lens in a lateral direction only.

2. In a photographic camera having an objective and an optical finding system comprising a fixed rear element and a front positive lens, interconnected means for simultaneously focusing the objective and moving the lens in a lateral direction only.

3. In a photographic camera, an objective, a mount for said objective, a movable member adapted to act on said mount to focus the objective and carrying a cam slot, a finder system including a positive lens, a mount for said lens slidable transversely of the optical axis of the system and means including a pin adapted to engage in the cam slot for moving said mount automatically when the lens is focused.

4. In a photographic camera, an objective, a mount for said objective, an annular member surrounding said mount and adapted, when moved, to act on said mount to focus the objective and having a cam surface, a finder system including optical elements, a mount for one of said elements slidable transversely of the optical axis of the system, and means engaging the cam and controlling the movement of the mount.

5. In a photographic camera, an objective, a mount for said objective adapted to be adjusted for focusing, a fixed focus finder system including a positive lens, a mount for said lens movable transversely of the optical system and an indicating and operating means on the camera adapted to show the distance for which the objective is focused and means connecting the indicating and operating means with both mounts and adapted to operate them to focus the objective for the distance indicated and to move the finder lens so that the axis of the finder system will intersect the axis of the objective at the distance indicated.

6. In a photographic camera, an objective, a mount for said objective adapted to be adjusted for focusing, a finding system for said camera the effective axis of which is adjustable, the finding system being of fixed focus and being particularly corrected for a position such that its axis intersects the axis of the objective at a finite point, and being capable of adjustment to parallelism with the axis of the objective and being also capable of adjustment to an inclination such that it intersects the axis of the objective at a point considerably nearer the camera than the said finite point.

7. In a photographic camera, an objective, a mount for said objective adapted to be adjusted for focusing, a finding system for said camera the effective axis of which is adjustable, the finding system being of fixed focus and being particularly corrected for a position such that its axis intersects the axis of the objective at a finite point, and being capable of adjustment to parallelism with the axis of the objective and being also capable of adjustment to an inclination such that it intersects the axis of the objective at a point considerably nearer the camera than the said finite point and means for simultaneously focusing the objective and inclining the axis of the finding system, whereby the latter will automatically intersect the axis of the objective at the point upon which the objective is focused.

8. In a photographic camera, an objective, a mount for said objective adapted to be adjusted for focusing, a finding system for said camera comprising a viewing field and a lens adjustable transversely of the system, thereby changing the inclination of the axis of the system, the system being particularly corrected for a position such that its axis intersects the axis of the objective at a finite distance, but the range of movement of the lens being such that the axis of the system may be parallel to the axis of the objective or may intersect it at a point considerably nearer than said finite point.

9. In a photographic camera, an objective, a mount for said objective adapted to be adjusted for focusing, a finding system for said camera comprising a viewing field and a lens adjustable transversely of the system, thereby changing the inclination of the axis of the system, the system being particularly corrected for a position such that its axis intersects the axis of the objective at a finite distance, but the range of movement of the lens being such that the axis of the system may be parallel to the axis of the objective or may intersect it at a point considerably nearer than said finite point, and means for simultaneously focusing the objective and adjusting said lens whereby the axis of the finding system will automatically intersect the axis of the objective at the point upon which the objective is focused.

Signed at Rochester, New York, this 2nd day of Feb., 1923.

JULIEN TESSIER.